US011531155B1

(12) United States Patent
Huang et al.

(10) Patent No.: US 11,531,155 B1
(45) Date of Patent: Dec. 20, 2022

(54) BACKLIGHT MODULE AND DISPLAY DEVICE HAVING THE SAME

(71) Applicant: AUO Display Plus Corporation, Hsinchu (TW)

(72) Inventors: Chih-Cheng Huang, Hsinchu (TW); Hong-Ming Chen, Hsinchu (TW); Ren-Wei Huang, Hsinchu (TW)

(73) Assignee: AUO DISPLAY PLUS CORPORATION, Hsinchu (TW)

( * ) Notice: Subject to any disclaimer, the term of this patent is extended or adjusted under 35 U.S.C. 154(b) by 0 days.

(21) Appl. No.: 17/862,602

(22) Filed: Jul. 12, 2022

(30) Foreign Application Priority Data

May 27, 2022 (TW) .................................. 111119936

(51) Int. Cl.
*F21V 8/00* (2006.01)
*G09F 9/30* (2006.01)

(52) U.S. Cl.
CPC ......... *G02B 6/0081* (2013.01); *G02B 6/0068* (2013.01); *G09F 9/301* (2013.01)

(58) Field of Classification Search
CPC ..... G02B 6/0081; G02B 6/0068; G09F 9/301; F21Y 2107/00; F21Y 2107/10
See application file for complete search history.

(56) References Cited

U.S. PATENT DOCUMENTS

| 2015/0131321 A1* | 5/2015 | Im ........................ G02B 6/0068 362/97.3 |
| 2021/0116750 A1* | 4/2021 | Kim ................... G02F 1/133603 |

FOREIGN PATENT DOCUMENTS

| CN | 102392990 A | 3/2012 | |
| CN | 103672614 B | 2/2017 | |
| EP | 2975452 A1 * | 1/2016 | ............... G02B 6/00 |
| EP | 3812833 A1 * | 4/2021 | ........... G02B 6/0055 |
| TW | I502248 B | 10/2015 | |
| TW | 201604716 | 2/2016 | |
| TW | 202113405 A | 4/2021 | |

* cited by examiner

*Primary Examiner* — Jong-Suk (James) Lee
*Assistant Examiner* — Glenn D Zimmerman
(74) *Attorney, Agent, or Firm* — WPAT, PC

(57) ABSTRACT

A backlight module includes a case body, supporting structures, light-emitting elements, and an optical module. The case body includes a first side wall and a second side wall opposite to the first side wall. Each of the support structures includes two supporting members and a bearing member. Two supporting members are respectively disposed on the first side wall and the second side wall. Each of the supporting member includes a fitting portion, an extending portion, and a bending portion. The fitting portion is fixed to the first side wall and the second side wall. The bearing member is disposed between the two supporting members. The light-emitting elements are respectively disposed on the bearing surface of the bearing member of the corresponding supporting structures. The optical module is disposed on the extending surface of the extending portion of each of the supporting structures. A display device is also provided.

8 Claims, 8 Drawing Sheets

BACKLIGHT MODULE AND DISPLAY DEVICE HAVING THE SAME

CROSS-REFERENCE TO RELATED APPLICATION

This non-provisional application claims priority under 35 U.S.C. § 119(a) to Patent Application No. 111119936 filed in Taiwan, R.O.C. on May 27, 2022, the entire contents of which are hereby incorporated by reference.

BACKGROUND

Technical Field

The present disclosure relates to a backlight module, in particular to a backlight module with supporting structures and a display device having the same.

Related Art

For a non-planar display device known to the inventor, such as a display device with a curved-shape, the display device usually has a more complex structure. For example, because the assembling components in the display device correspond to the curved display device, corresponding assembling structures have to be designed. In this way, not only extra cost is caused, but also the structure of the backlight module becomes more complex or the size of the backlight module is increased.

SUMMARY

In view of this, according to one embodiment, a backlight module is provided and comprises a case body, a plurality of supporting structures, a plurality of light-emitting elements, and an optical module. The case body comprises a first side wall and a second side wall opposite to the first side wall. Each of the support structures comprises two supporting members and a bearing member. Two supporting members are respectively disposed on the first side wall and the second side wall. Each of the supporting members comprises a fitting portion, an extending portion, and a bending portion, and the fitting portion of each of the supporting members is fixed to the first side wall and the second side wall. The extending portion is adjacently connected to the fitting portion and extends toward an outside of the case body, and the extending portion has an extending surface. The bending portion is adjacently connected to the extending portion and bent toward an inside of the case body. The bearing member is disposed between the two supporting members. The bearing member has a bearing surface. The light-emitting elements are respectively disposed on the bearing surface of the corresponding supporting structures. The optical module is disposed on the extending surface of each of the supporting structures.

In some embodiments, the first side wall and the second side wall comprise a plurality of assembling portions corresponding to the supporting structures, and each of the assembling portions comprises a locking portion and a positioning concave portion. The supporting members of each of the supporting structures are respectively disposed in the positioning concave portion of the first side wall and the positioning concave portion of the second side wall, and the supporting members of each of the supporting structures are locked to the locking portion.

In some embodiments, the case body further comprises a third side wall and a fourth side wall opposite to the third side wall, the third side wall is adjacently connected to the first side wall and the second side wall respectively, and the fourth side wall is adjacently connected to the first side wall and the second side wall, respectively. A side portion of the first side wall and a side portion of the second side wall are of a curved-shape and extend from the third side wall to the fourth side wall.

In some embodiments, the backlight module defines a first curvature center, and each of the support structures defines a reference line; each of the reference lines is perpendicular to a corresponding one of the bearing surfaces and parallel to an assembling direction of each of the support structures, and the reference lines of the support structures intersect at the first curvature center.

In some embodiments, the support structures are a plurality of first support structures and a plurality of second support structures. The backlight module further defines a second curvature center, the reference lines of the first support structures intersect at the first curvature center, and the reference lines of the second support structures intersect at the second curvature center.

In some embodiments, the backlight module further comprising a support platform disposed between two adjacent support structures among the support structures. An electronic device is disposed on the support platform.

In some embodiments, the case body has a cavity, and an electronic device is assembled in the cavity.

According to one embodiment, a display device is provided and comprises a panel and the backlight module of the foregoing embodiment(s). The bending portion has a bending surface, and the panel is disposed on the bending surface of each of the supporting structures.

Based on the above, according to one embodiment, the backlight module and the display device using the backlight module are provided. The backlight module integrates the light-emitting element and the optical module through the support structures, and the backlight module can also be applied to be assembled with a panel in a display device. In this way, according to some embodiments, the assembling of the backlight module and the display device can be simplified. In addition, when the case body is of a curved-shape, the support structures can also replace the non-planar and continuous complex structures for assembling with the light-emitting element, the optical module, and the panel.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
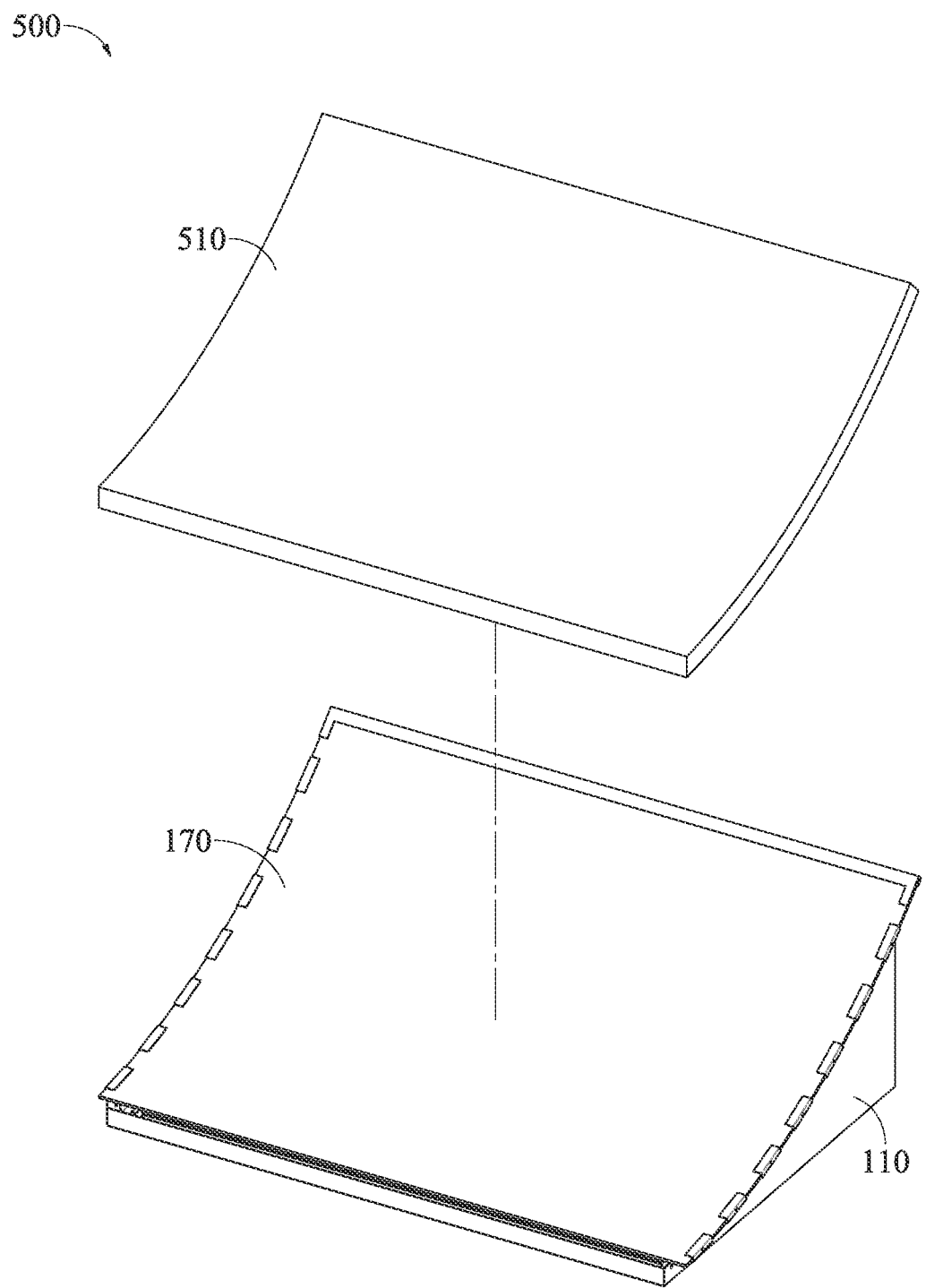
FIG. 1 illustrates an exploded partial view of a display device according to a first embodiment.
Figure 2:
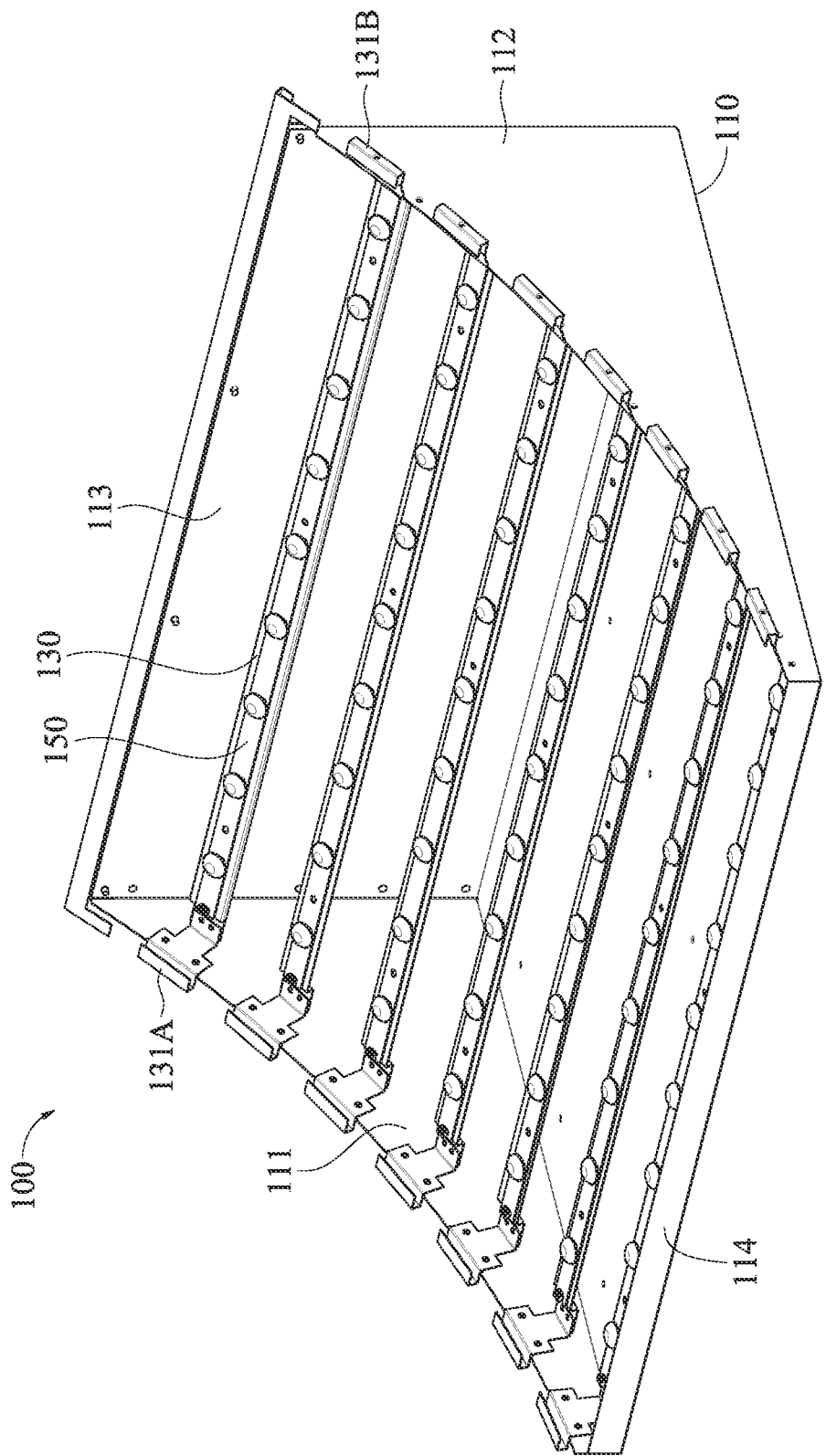
FIG. 2 illustrates a perspective view (1) of a backlight module according to the first embodiment.

Please refer to FIG. 1 and FIG. 2. FIG. 1 illustrates an exploded partial view of a display device according to a first embodiment. FIG. 2 illustrates a perspective view (1) of a backlight module according to the first embodiment. For the convenience of description, in FIG. 2, some elements are omitted to show the internal structure of the backlight module 100 more clearly. As shown in FIG. 1 and FIG. 2, a backlight module 100 comprises a case body 110, a plurality of supporting structures 130, a plurality of light-emitting elements 150, and an optical module 170. In the first embodiment, the backlight module 100 can be applied to a display device 500, and the structure of the display device 500 will be described in detail later.

The case body 110 comprises a first side wall 111 and a second side wall 112 opposite to the first side wall 111. In the first embodiment, the case body 110 further comprises a third side wall 113 and a fourth side wall 114 opposite to the third side wall 113. The third side wall 113 is adjacently connected to the first side wall 111 and the second side wall 112 respectively. The fourth side wall 114 is adjacently connected to the first side wall 111 and the second side wall 112, respectively. A side portion of the first side wall 111 and a side portion of the second side wall 112 are of a curved-shape and extend from the third side wall 113 to the fourth side wall 114. In the first embodiment, the case body 110 is of a curved-shape, but embodiments are not limited thereto; in some embodiments, the case body 110 may also be of a rectangle-shape.

Figure 3:
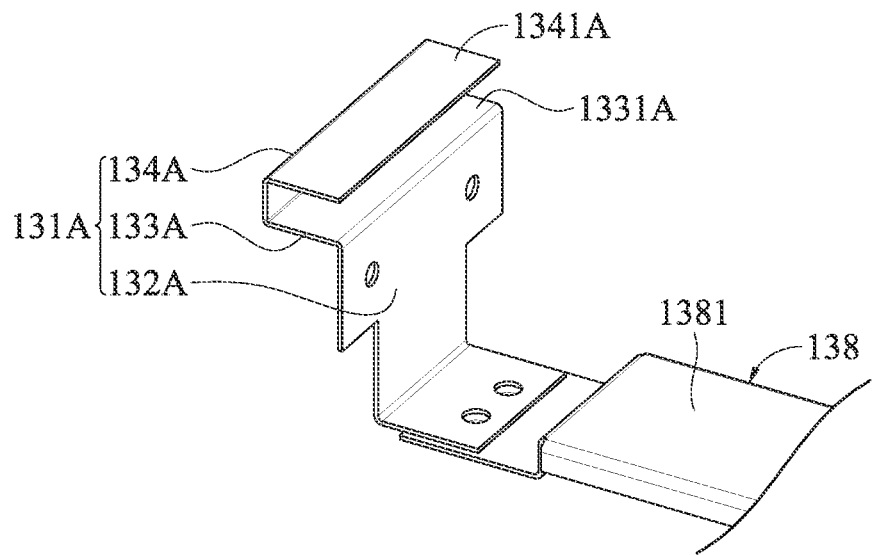
FIG. 3 illustrates a partial schematic view (1) of a support structure according to the first embodiment.
Figure 4:
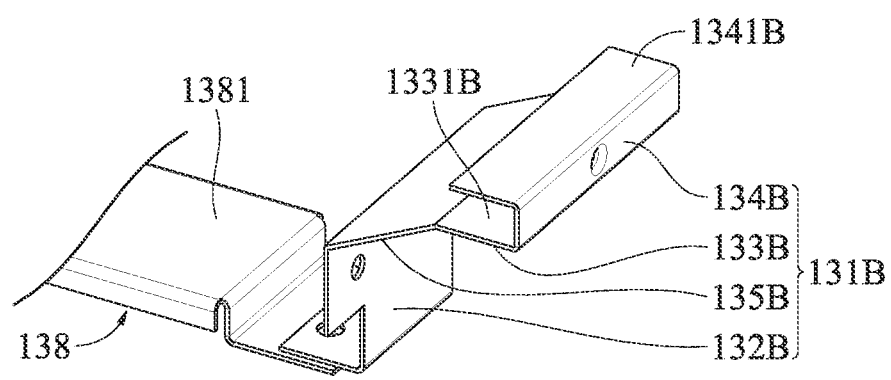
FIG. 4 illustrates a partial schematic view (2) of the support structure according to the first embodiment.

Please refer to FIG. 3 and FIG. 4. FIG. 3 illustrates a partial schematic view (1) of a support structure according to the first embodiment. FIG. 4 illustrates a partial schematic view (2) of the support structure according to the first embodiment. As shown in FIG. 2 as well as FIG. 3 and FIG. 4, each of the support structures 130 comprises two supporting members 131A, 131B and a bearing member 138. The two supporting members 131A, 131B are respectively disposed on the first side wall 111 and the second side wall 112. The supporting member 131A comprises a fitting portion 132A, an extending portion 133A, and a bending portion 134A. The supporting member 131B comprises a fitting portion 132B, an extending portion 133B, and a bending portion 134B. The fitting portions 132A, 132B of the supporting members 131A, 131B are respectively fixed to the first side wall 111 and the second side wall 112. The extending portions 133A, 133B are respectively adjacently connected to the fitting portions 132A, 132B and extend toward an outside of the case body 110. The extending portion 133A has an extending surface 1331A and the extending portion 133B has an extending surface 1331B. The bending portions 134A, 134B are respectively adjacently connected to the extending portions 133A, 133B and bent toward an inside of the case body 110. The bending portion 133A has a bending surface 1341A and the bending portion 133B has a bending surface 1341B. The bearing member 138 is disposed between the two supporting members 131A, 131B. The bearing member 138 has a bearing surface 1381. In the first embodiment, the bearing member 138 is locked to the fitting portions 132A, 132B of the two supporting members 131A, 131B, respectively, in a manner of, for example, screw locking.

In the first embodiment, the two support members 131A, 131B have different structures so as to be assembled on the casings with different shapes respectively, but embodiments are not limited thereto, the two support members 131A, 131B may also have the same structure. In the first embodiment, as shown in FIG. 4, the support member 131B further comprises an auxiliary portion 135B, and the auxiliary portion 135B is adjacently connected to the fitting portion 132B and the extending portion 133B, respectively. The auxiliary portion 135B inclinedly extends to the outside of the case body 110. In this way, when the thicknesses or the heights of two side walls to be correspondingly assembled with the two sides of the case body 110 are not identical to each other, the length or the height of the case body 110 can be extended through the auxiliary portion 135B, so that the case body 110 can be mated with casings having different shapes. The auxiliary portion 135B in FIG. 4 extends in an inclined manner, but embodiments are not limited thereto, in some embodiments, the auxiliary portion may also extend in a curved manner.

Please refer again to FIG. 1 and FIG. 2 and also refer to FIG. 3 and FIG. 4. A plurality of light-emitting elements 150 is respectively disposed on the bearing surface 1381 of the corresponding supporting structures 138. The optical module 170 is disposed on the extending surfaces 1331A, 1331B of each of the supporting structures 130. In the first embodiment, the light-emitting element 150 is a light bar and is disposed on the bearing surface 1381 to emit light to the outside of the case body 110. As shown in FIG. 1, The optical module 170 has a curved-shape corresponding to the curved-shape of the case body 110. A portion of the optical module 170 is respectively supported by the extending surfaces 1331A, 1331B of the supporting structure 130, so that the optical module 170 is supported through the supporting structures 130.

For the structure of the display device 500, please refer to FIG. 1 to FIG. 4, in the first embodiment, the display device 500 comprises a panel 510 and the backlight module 100. The bending portion 133A of each of the support structures 130 of the backlight module 100 has a bending surface 1341A, the bending portion 133B of each of the support structures 130 of the backlight module 100 has a bending surface 1341B, and the panel 510 is disposed on the bending surfaces 1341A, 1341B of each of the supporting structures 130. In addition, the panel 510 also has a curved-shape corresponding to the case body 110. In this way, in the display device 500, the panel 510 can be supported through the supporting structures 130 of the backlight module 100.

Specifically, in this embodiment, the backlight module 100 is applied to the display device 500. The backlight module 100 integrates the light-emitting element 150, the optical module 170, and the panel 510 through the support structures 130. In this way, according to some embodiment, the assembling of the backlight module 100 and the display device 500 is simplified. In addition, when the case body 110 is of a curved-shape, the support structures 130 can also replace the non-planar and continuous complex structures for assembling with the light-emitting element 150, the optical module 170, and the panel 510.

Figure 5:
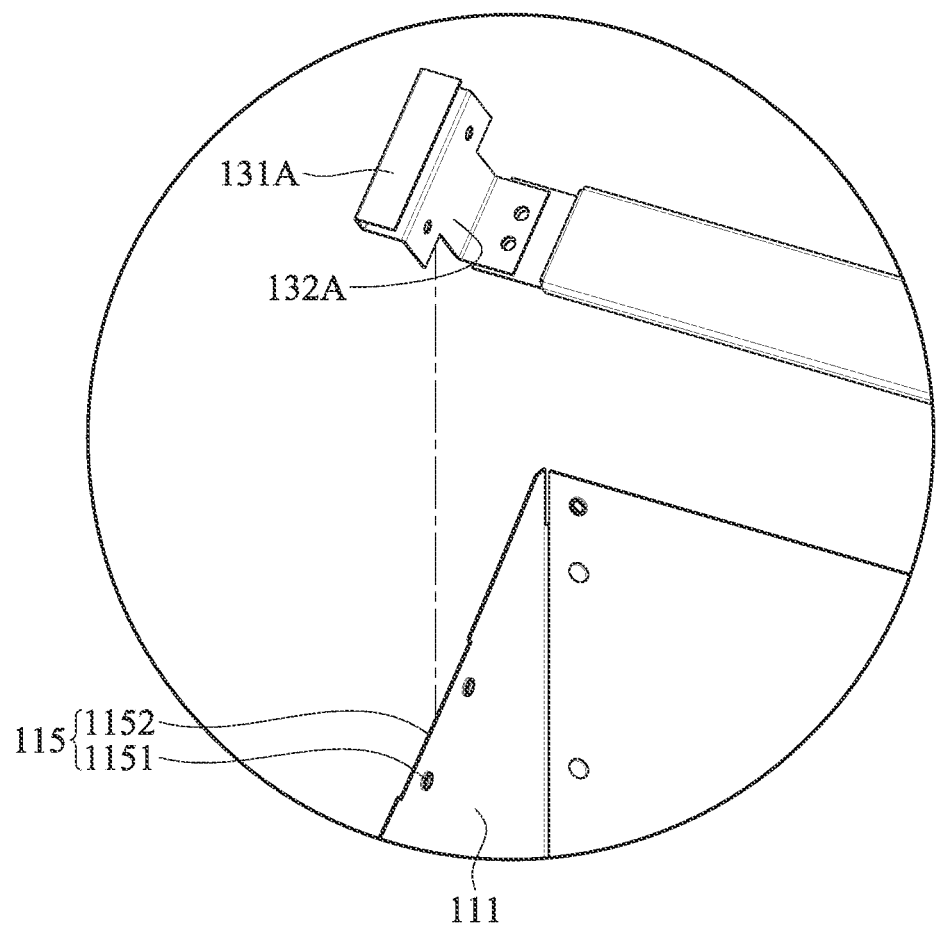
FIG. 5 illustrates a schematic view (1) showing that, according to the first embodiment, the support structure is to be assembled with a case body.

Please refer to FIG. 2 and FIG. 5. FIG. 5 illustrates a schematic view (1) showing that, according to the first embodiment, the support structure is to be assembled with a case body. In the first embodiment, the first side wall 111 and the second wall 112 comprise a plurality of assembling portions 115 corresponding to the supporting structures 130, and each of the assembling portions 115 comprises a locking portion 1151 and a positioning concave portion 1152. The supporting members 131A, 131B of each of the supporting structures 130 are respectively disposed in the positioning concave portion 1152 of the first side wall 111 and the positioning concave portion 1152 of the second side wall 112, and the supporting members 131A, 131B of each of the supporting structures 130 are locked to the locking portion 1151. As shown in FIG. 5, the supporting member 131A on one side is used for illustration. By assembling the support member 131A with the corresponding positioning concave portion 1152 and mating the screw hole of the fitting portion 132A with the locking portion 1151, the fitting portion 132A is fixed to the first side wall 111 by the manner of screw locking. In addition, the positioning concave portions 1152 are spacedly arranged on the first side wall 111, so that the user can intuitively identify the assembling position of the support structure 130 and assemble the support structure 130 with the case body 110 conveniently.

Figure 6:
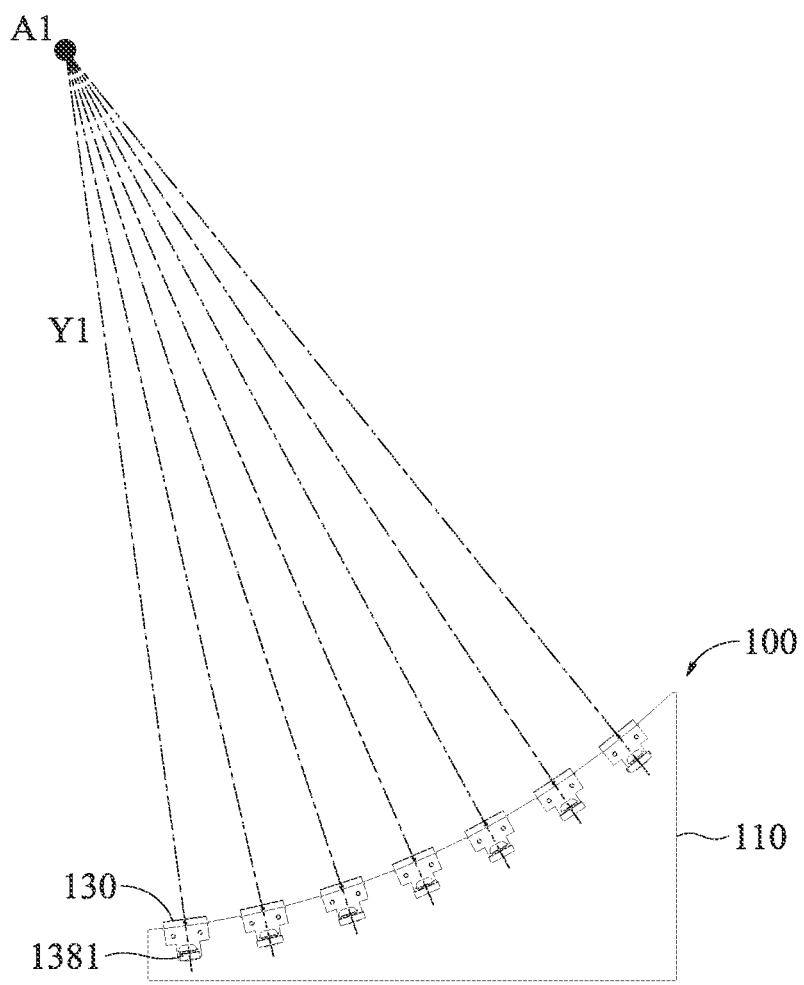
FIG. 6 illustrates a schematic view (2) showing that, according to the first embodiment, the support structures are assembled on the case body.

Please refer to FIG. 6. FIG. 6 illustrates a schematic view (2) showing that, according to the first embodiment, the support structure are assembled on the case body. In the first embodiment, the backlight module 100 defines a first curvature center A1, and each of the support structures 130 defines a reference line Y1. Each of the reference lines Y1 is perpendicular to a corresponding one of the bearing surfaces 1381 and parallel to an assembling direction of each of the support structures 130, and the reference lines Y1 of the support structures 130 intersect at the first curvature center A1. As shown in FIG. 6, each of the reference lines Y1 is perpendicular to the plane where a corresponding one of the bearing surfaces 1381 is located and parallel to the assembly direction of each of the support structures 130 toward the case body 110 (as shown in FIG. 5), and the intersection of extensions of the reference lines Y1 is the first curvature center A1. In addition, please refer to FIG. 1 and FIG. 2, the side portion of the first side wall 111 and the side portion of the second side wall 112 are taken the first curvature center A1 as a center and extend from the third side wall 113 to the fourth side wall 114. In this way, the supporting structures 130 are arranged by taking the first curvature center A1 as the center. From the front perspective view of FIG. 6, the backlight module 100 has an arc-shape. The light-emitting elements 150 disposed on the support structures 130 can emit light to the curved panel 510 evenly, so as to maintain a good display quality. In the first embodiment, the case body 110 is arc-shaped, but embodiments are not limited thereto; in some embodiments, the case body 110 may be C-shaped or wavy-shaped. Other shapes of the case body 110 will be described in detail later.

Figure 7:
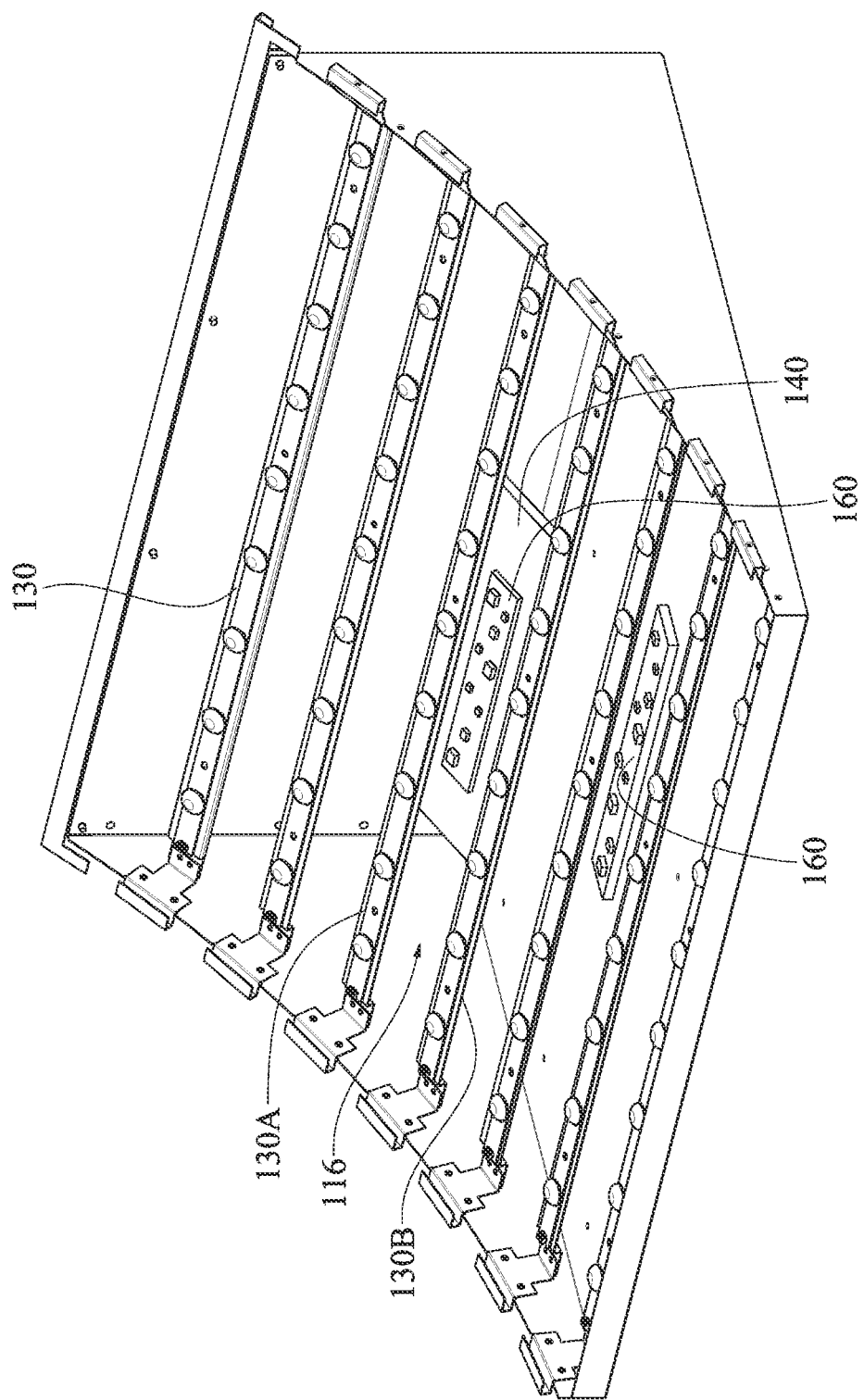
FIG. 7 illustrates a perspective view (2) of the backlight module according to the first embodiment.

Please refer to FIG. 7. FIG. 7 illustrates a perspective view (2) of the backlight module according to the first embodiment. In the first embodiment, the backlight module 100 further comprises a support platform 140 disposed between two adjacent support structures 130A, 130B among the support structures 130, and an electronic device 160 is disposed on the support platform 140. As shown in FIG. 7, the support platform 140 is partially formed between the support structures 130A, 130B, but embodiments are not limited thereto; in some embodiments, the support platform 140 can also be fixed between the support structures 130A and 130B by screw locking. In this way, according to some embodiments, through the supporting platform 140, the space between the supporting structures 130 can be effectively utilized for assembling other electronic devices 160.

In addition, the case body 110 has a cavity 116, and the electronic device 160 can also be assembled in the cavity 116.

Figure 8:
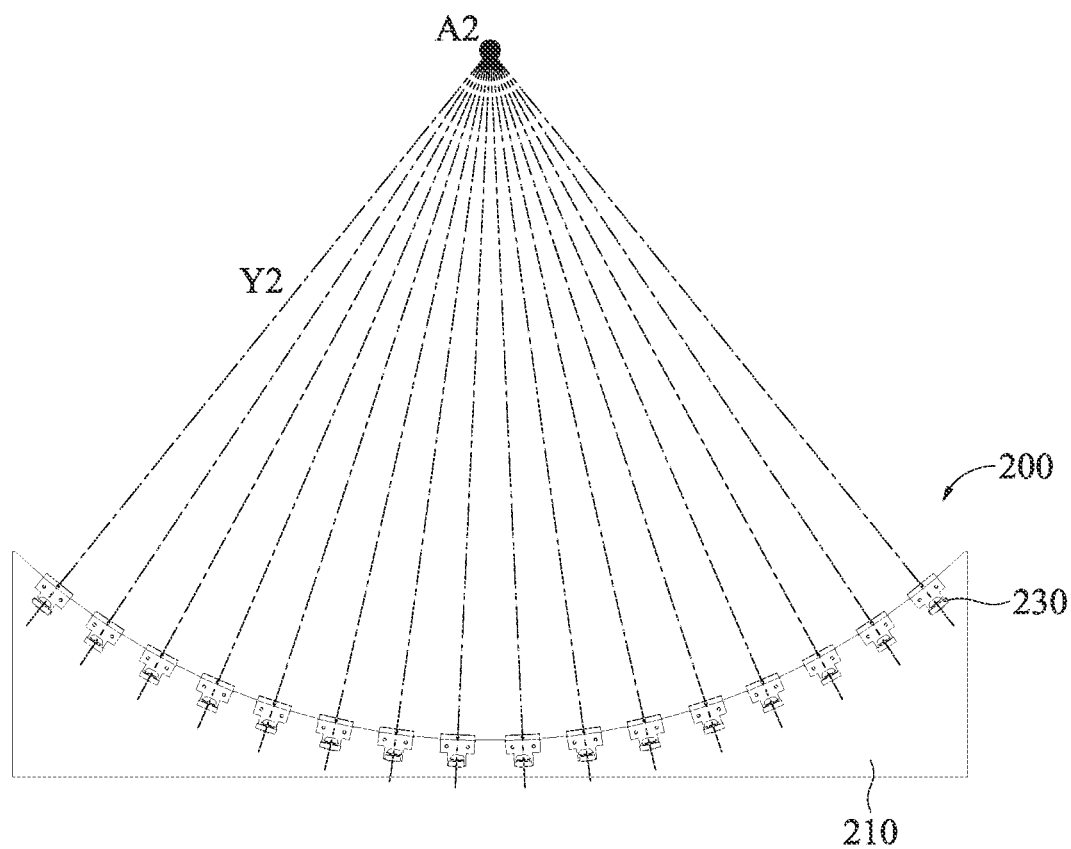
FIG. 8 illustrates a schematic view showing that, according to a second embodiment, the support structures are assembled with a case body.

Please refer to FIG. 8. FIG. 8 illustrates a schematic view showing that, according to a second embodiment, the support structures are assembled with a case body. Regarding other shapes of the case body, in the second embodiment, from the front perspective view of FIG. 8, the side portion of the side wall of the case body 210 is C-shaped. The reference lines Y2 of the support structures 230 extend and intersect at the first curvature center A2, and the support structures 230 disposed on the side wall of the case body 210 are arranged by taking the first curvature center A2 as the center. In this way, the backlight module 200 with a C-shaped configuration can be implemented.

Figure 9:
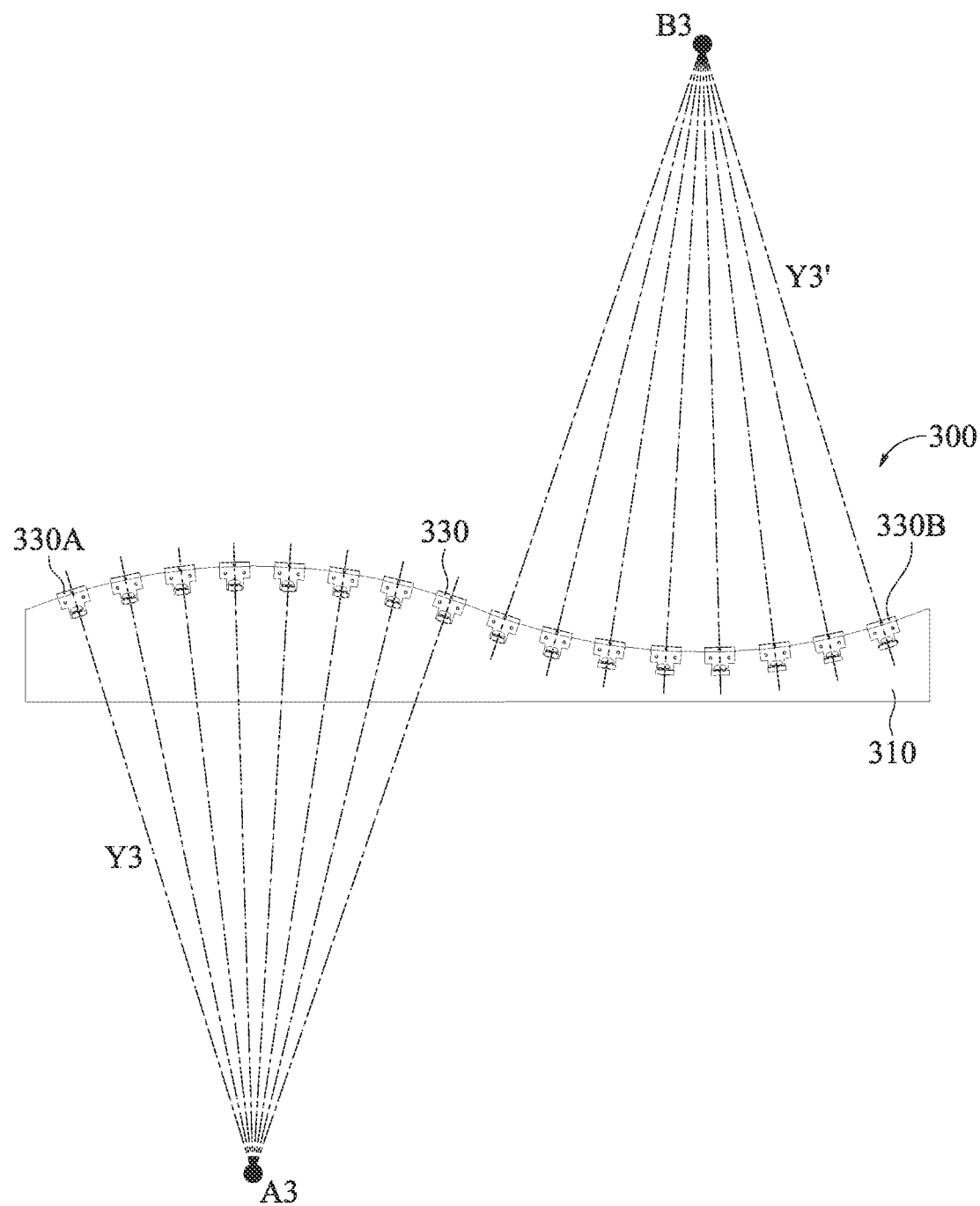
FIG. 9 illustrates a schematic view showing that, according to a third embodiment, the support structures are assembled with a case body.

Please refer to FIG. 9. FIG. 9 illustrates a schematic view showing that, according to a third embodiment, the support structures are assembled with a case body. Regarding other shapes of the case body, in the third embodiment, from the front perspective view of FIG. 9, the side portion of the side wall of the case body 310 is wavy-shaped. In additional, the support structures 330 are a plurality of first support structures 330A and a plurality of second support structures 330B. The backlight module 300 further defines a second curvature center B3, the reference lines Y3 of the first support structures 330A intersect at the first curvature center A3, and the reference lines Y3' of the second support structures 330B intersect at the second curvature center B3. As shown in FIG. 9, from the left side to the right side in FIG. 9, a portion of the side portion of the side wall of the case body 310 is formed as a first curved surface by taking the first curvature center A3 as the center, and the first support structures 330A are arranged on the side wall by taking the first curvature center A3 as the center. Another portion of the side portion of the side wall of the case body 310 is formed as a second curved surface by taking the second curvature center B3 as the center, and the second support structures 330B are arranged on the side wall by taking the second curvature center B3 as the center. In this way, the backlight module 300 with a wavy-shaped configuration can be implemented.

Based on the above, according to some embodiments, the backlight module can be applied to the display device. The backlight module integrates the light-emitting element and the optical module through the support structures, and the backlight module can also be applied to be assembled with a panel in a display device. In this way, according to some embodiments, the assembling of the backlight module and the display device can be simplified. In addition, the support structure can correspond to casings with various shapes. When the case body is of a curved-shape, the support structures can also replace the non-planar and continuous complex structures for assembling with the light-emitting element, the optical module, and the panel.

What is claimed is:
1. A backlight module, comprising:
a case body comprising a first side wall and a second side wall opposite to the first side wall;
a plurality of supporting structures, wherein each of the support structures comprises:
two supporting members respectively disposed on the first side wall and the second side wall, wherein each of the supporting members comprises a fitting portion, an extending portion, and a bending portion, and the fitting portion of each of the supporting members is fixed to the first side wall and the second side wall; the extending portion is adjacently con- nected to the fitting portion and extends toward an outside of the case body, the extending portion has an extending surface, and the bending portion is adjacently connected to the extending portion and bent toward an inside of the case body; and a bearing member disposed between the two supporting members, wherein the bearing member has a bearing surface;

a plurality of light-emitting elements respectively disposed on the bearing surface of the corresponding supporting structures; and an optical module disposed on the extending surface of each of the supporting structures.

2. The backlight module according to claim 1, wherein the first side wall and the second side wall comprise a plurality of assembling portions corresponding to the supporting structures, and each of the assembling portions comprises a locking portion and a positioning concave portion; the supporting members of each of the supporting structures are respectively disposed in the positioning concave portion of the first side wall and the positioning concave portion of the second side wall, and the supporting members of each of the supporting structures are locked to the locking portion.

3. The backlight module according to claim 1, wherein the case body further comprises a third side wall and a fourth side wall opposite to the third side wall, the third side wall is adjacently connected to the first side wall and the second side wall respectively, and the fourth side wall is adjacently connected to the first side wall and the second side wall, respectively; a side portion of the first side wall and a side portion of the second side wall are of a curved shape and extend from the third side wall to the fourth side wall.

4. The backlight module according to claim 3, wherein the backlight module defines a first curvature center, and each of the support structures defines a reference line; each of the reference lines is perpendicular to a corresponding one of the bearing surfaces and parallel to an assembling direction of each of the support structures, and the reference lines of the support structures intersect at the first curvature center.

5. The backlight module according to claim 4, wherein the support structures are a plurality of first support structures and a plurality of second support structures; the backlight module further defines a second curvature center, the reference lines of the first support structures intersect at the first curvature center, and the reference lines of the second support structures intersect at the second curvature center.

6. The backlight module according to claim 1, further comprising a support platform disposed between two adjacent support structures among the support structures, wherein an electronic device is disposed on the support platform.

7. The backlight module according to claim 1, wherein the case body has a cavity, and an electronic device is assembled in the cavity.

8. A display device, comprising:
a panel; and
a backlight module according to claim 1;
wherein the bending portion has a bending surface, and the panel is disposed on the bending surface of each of the supporting structures.

* * * * *